United States Patent

Barrowman et al.

[11] Patent Number: 4,606,129
[45] Date of Patent: Aug. 19, 1986

[54] GAP AND FLUSHNESS MEASURING TOOL

[75] Inventors: Thomas Barrowman, Warren; Michael J. Noblett, Mt. Clemens, both of Mich.

[73] Assignee: General Motors Corporation, Detroit, Mich.

[21] Appl. No.: 788,966

[22] Filed: Oct. 18, 1985

[51] Int. Cl.⁴ .................................. G01B 7/14
[52] U.S. Cl. ...................... 33/143 L; 33/169 B; 33/180 AT; 33/533
[58] Field of Search ............ 33/143 L, 169 B, 180 R, 33/180 AT, 181 AT, 533, 147 N, 147 R

[56] References Cited
U.S. PATENT DOCUMENTS 3,867,037  2/1975  Litke ................................ 33/125 C
4,345,380  8/1982  Vis ..................................... 33/147 N
4,536,964  8/1985  Lazes ................................. 33/169 B
4,554,742  11/1985  Freitag ............................. 33/143 L

*Primary Examiner*—Willis Little
*Attorney, Agent, or Firm*—Warren D. Hill

[57] ABSTRACT

A tool for simultaneously measuring the gap and flushness between two adjacent panels includes a pair of probes for engaging the panel edges and adjacent surfaces, one probe being slideable in one direction to adjust to the panel gap and the other probe being slideable at right angles to the other to adjust to different flushness values. The probes are equipped with electrical position transducers to give readings on gap and flushness. The probes can be slid along a gap to obtain a rapid succession of data points. One embodiment has rollers for probe contact surfaces to aid in sliding the tool along the panels.

9 Claims, 7 Drawing Figures

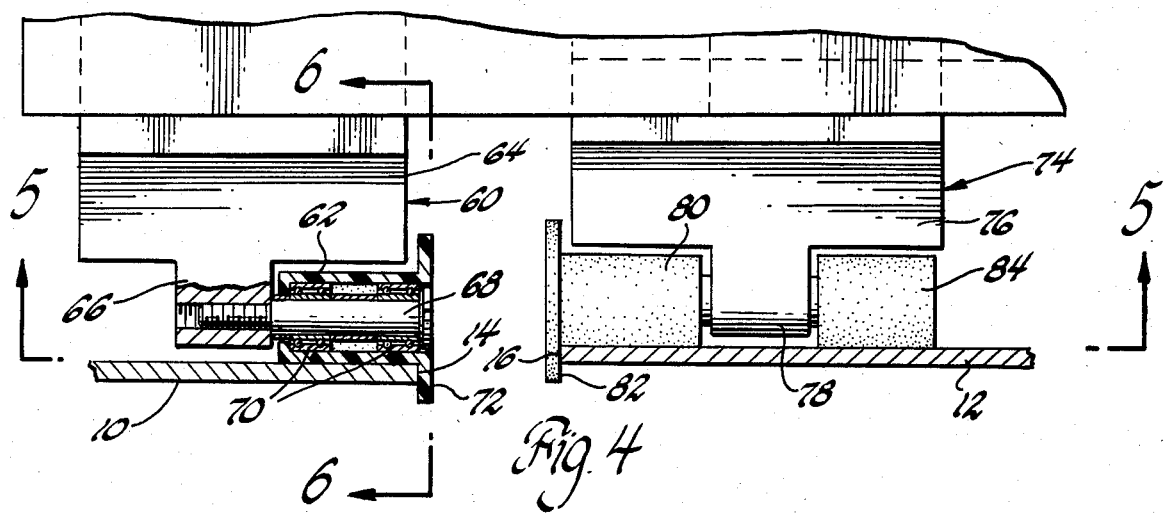
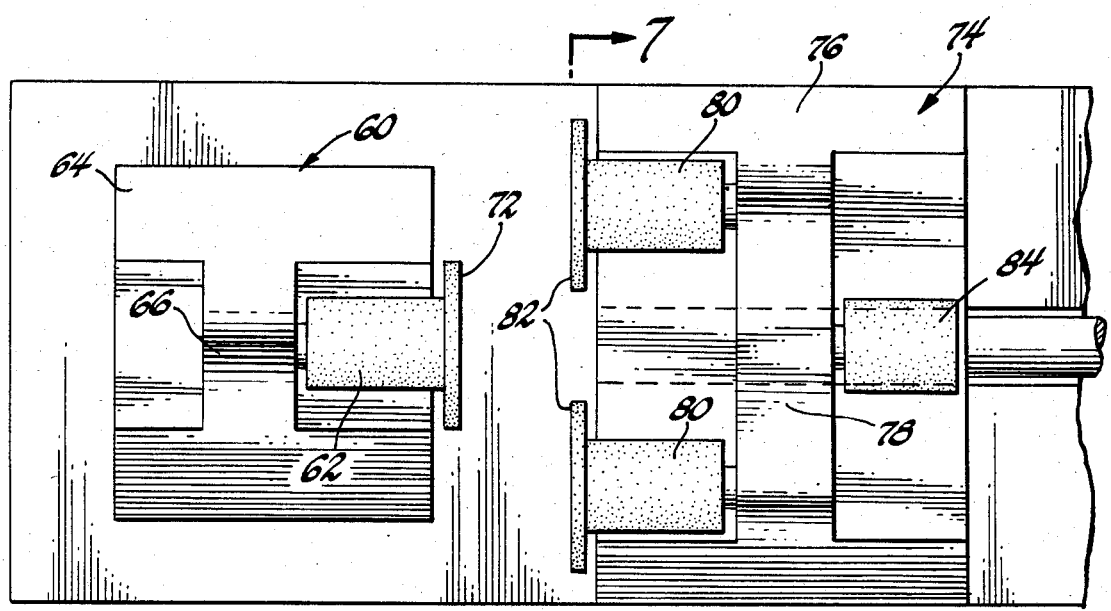
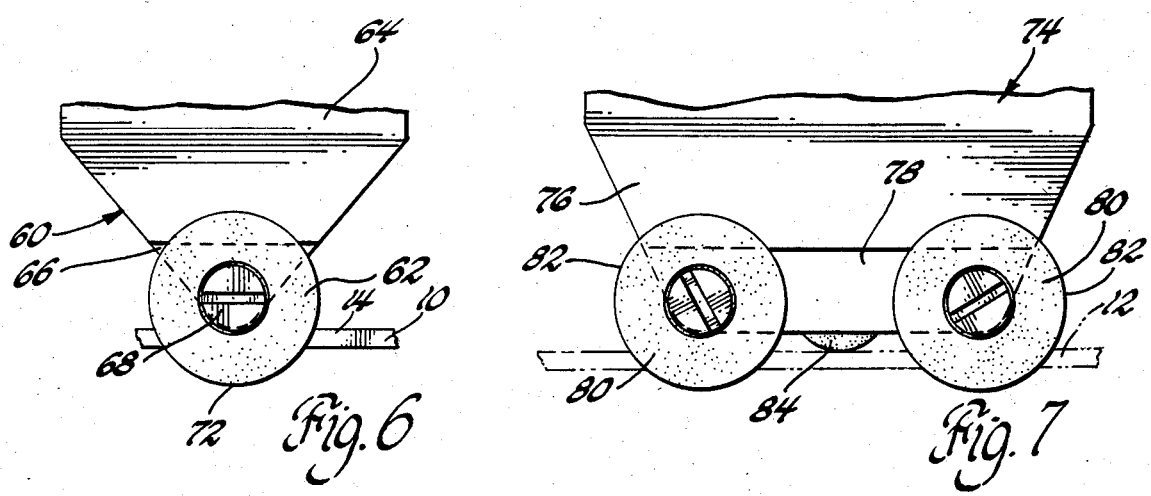

GAP AND FLUSHNESS MEASURING TOOL

FIELD OF THE INVENTION

This invention relates to measuring tools and particularly to tools of the type for measuring the gap between adjacent panels and panel flushness.

BACKGROUND OF THE INVENTION

To measure the quality of assemblies comprising spaced panels it is desirable to measure the spacings between panel edges and panel surfaces. For example automobiles have gaps between doors and surrounding panels as well as between the hood and fenders, and during manufacture measurements are frequently made to assure that the correct gap size and panel flushness has been obtained.

It has been the practice to use manually operated feeler gages and straight edge tools to make the gap and flushness measurements. That method is very slow and its accuracy is highly dependent on the skill of the operator. In addition, where it is desired to record the data for record purposes or for calculations the results of the measurements must be entered manually. It is known, however, to instrument a measuring tool to obtain data in the form of electrical signals and to display the measurement in numeric form.

SUMMARY OF THE INVENTION

It is therefore an object of the invention to provide a tool for simultaneously measuring the gap between panels and the flushness of panel surfaces.

It is another object of the invention to provide such a tool which has electrical data output.

The invention is carried out by a device for simultaneously measuring the gap between edges of adjacent panels and the flushness of panel surfaces comprising a body, first and second probes mounted on the body, each probe having a finger for extending into the gap to contact a panel edge and a pad for contacting a panel surface, the first probe being mounted for movement in a direction to ensure engagement of both probe fingers with panel edges, the second probe being mounted for movement in a direction to ensure engagement of the probe pads with the panel surfaces, and means for measuring the position of each probe to obtain a measure of the gap between the panels and the flushness of the panel surfaces.

The invention further contemplates probe pads comprising rollers for facilitating movement along the gap, and fingers comprising flanges on the rollers for engaging the panel edges.

BRIEF DESCRIPTION OF THE DRAWINGS

The above and other advantages of the invention will become more apparent from the following description taken in conjunction with the accompanying drawings wherein like reference numerals refer to like parts and wherein:

FIG. 4 is a view of a portion of the device according to a second embodiment of the invention incorporating rollers in the probes of the device of FIG. 2, FIGS. 5 and 6 are views of the device of FIG. 4 taken along lines 5—5 and 6—6 respectively of FIG. 4, and FIG. 7 is a view of the device taken along line 7—7 of FIG. 5.

DESCRIPTION OF THE PREFERRED EMBODIMENT

Figure 1:
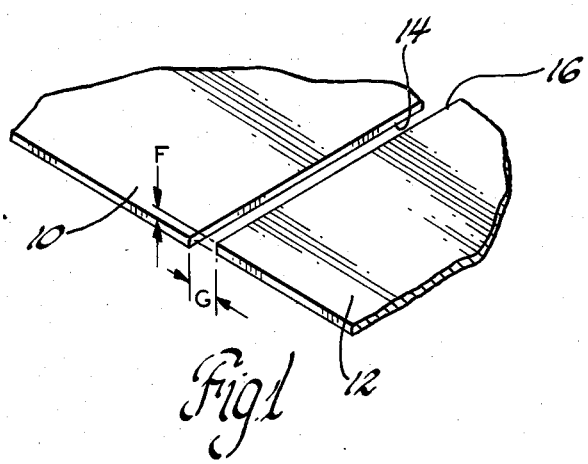
FIG. 1 is an isometric view of a pair of spaced adjacent panels illustrating gap and flushness.

FIG. 1 shows a pair of panels 10 and 12 representing adjacent sheets of metal on a structure such as a vehicle body. The surfaces of the panels are intended to be nearly in the same plane or flush. As shown, the planes are separated by a distance "F" which is determined by a flushness measurement. The facing edges 14 and 16 are spaced by a gap "G". Both values are to be measured to obtain data revealing the quality of the panel assembly, or to assist in setting up assembly fixtures.

Figure 2:
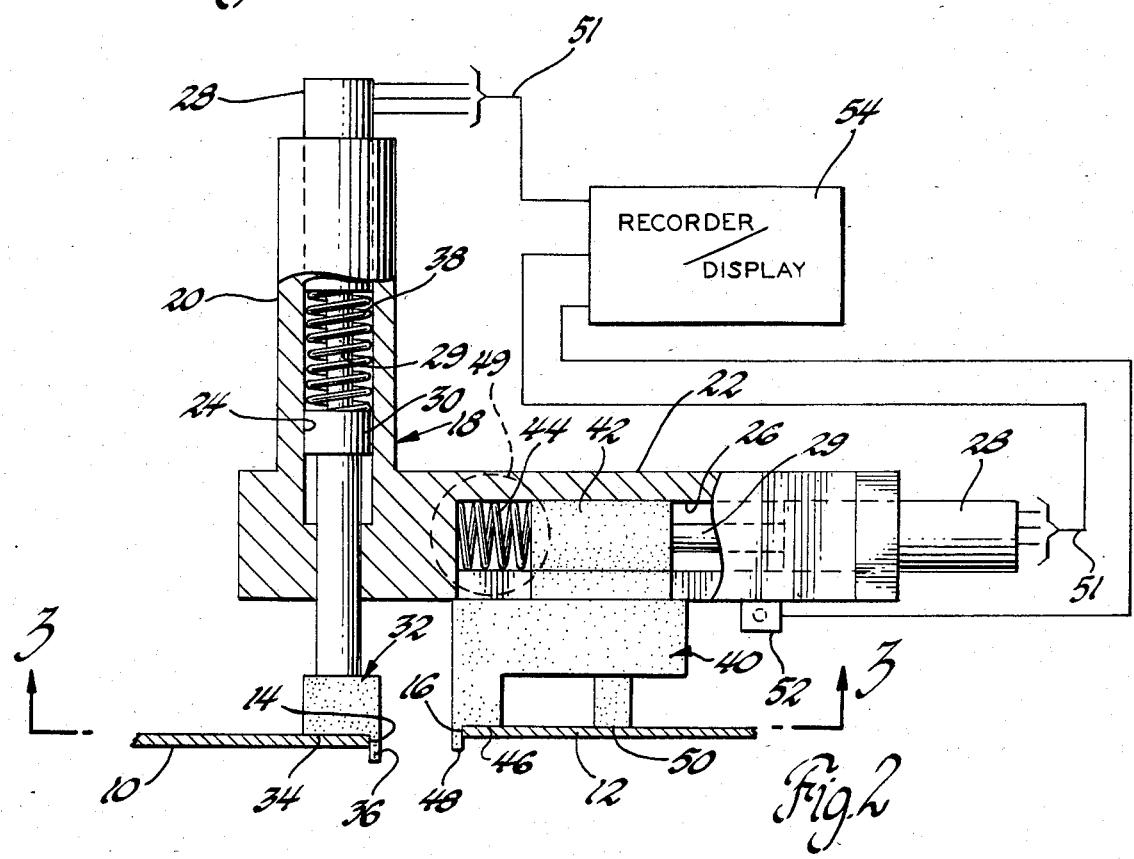
FIG. 2 is an elevational view of a pair of panels in section and a device for measuring panel gap and flushness according to the invention.
Figure 3:
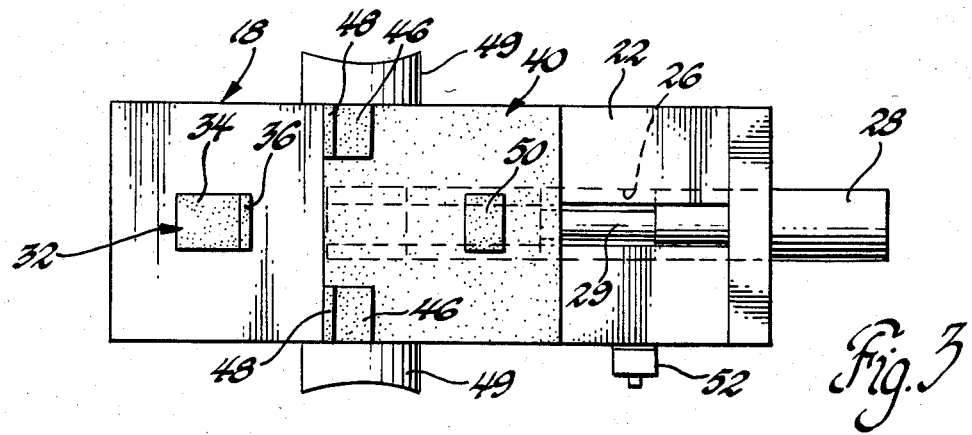
FIG. 3 is a bottom view of the device taken along line 3—3 of FIG. 2.

The instrument for measuring the gap and flushness simultaneously is shown in FIGS. 2 and 3. An L-shaped body 18 comprising legs 20 and 22 contains bores 24 and 26, respectively, which hold electrical transducers 28 in the outer end of each leg. The bore 24 contains a slide element 30 moveable along the axis of the leg 20 which element carries a probe 32 that extends beyond the body 18. The probe 32 has a contact face or pad 34 on its end for engagement with the surface of a panel. A finger 36 extends from one edge of the pad in the direction of the slide motion for engagement with the edge 14 of a panel 10. Since the probe 32 moves only in the slide direction of element 30 and not laterally, the finger position on the edge of the panel determines a reference position of the edge 14 with respect to the instrument. A spring 38 in the bore 24 biases the slide element 30 toward the probe extended position to urge the pad 34 against the surface of the panel 10.

A probe 40 carried on the leg 22 for movement parallel to the leg 22 and perpendicular to the motion of probe 32 is mounted on a slide 42 in the bore 26. A spring 44 in the bore 26 biases the slide and probe 40 away from the other probe 32. A pair of spaced contact pads 46 are positioned along an edge of the probe 40 nearest the probe 32 and each have a finger 48 extending parallel to the finger 36 and positioned on either side of the finger 36. The pads 46 and the fingers 48 engage the panel 12 surface and edge 16 respectively as shown in FIG. 2. The probe 40 carries another contact pad 50 spaced to the rear of and in the same plane as the pads 46 to assure correct orientation of the probe 40 on the panel 12. A pair of grips 49 are secured to opposite sides of leg 22 to assist in holding and manipulating the instrument.

The slides 30 and 42 are coupled to the transducers 28 by stems 29. The transducers may be of any desired type such as LVDTs but linear potentiometers are preferred. The signals from the transducers represent the probe positions and thus are measures of the panel flushness and gap when properly calibrated. The transducer 28 connected to the probe 40 should be set to give the separation of the fingers 36 and 48 which corresponds to the gap size. The other transducer should be set to give the spacing of the contact pad 34 from the reference plane defined by the pads 46 and 50 to yield the flushness measurement. The output lines 51 of the transducers 28 are coupled to a recorder or display 54 as desired. A computer may be used to record and evaluate the data or a simple numerical display can be used to indicate the flushness and gap values. A manually operated switch 52 signals to the recorder/display 54 when a measurement should be taken. By holding the switch closed measurements can be taken in rapid succession and the instrument can be slid along the gap to make measurements at many points along the gap.

In use the instrument is held against the panels to be gauged with the probe 40 positioned close to probe 32 to allow the fingers 36 and 48 to be inserted into the gap between the panels. The action of the spring 44 urges the fingers apart to firmly contact the respective panel edges. The instrument must be held properly to seat the contact pads 46 and 50 against a panel. This establishes the reference plane of the panel surface which is the zero reference of the probe 32. The spring 38 holds the probe 32 against the other panel. The switch 52 then is manually operated to initiate measurements. If a plurality of data points along the gap is desired the instrument is slid along the gap with the switch 52 depressed.

To facilitate sliding the instrument along the gap the flat pads of FIGS. 2 and 3 are replaced by rollers and the fingers take the form of flanges on the rollers according to the second embodiment of the invention. As shown in FIGS. 4, 5, 6 and 7, the probe 32 is replaced by probe 60 which holds a single roller 62. A base plate 64 supports a tapered web 66. The roller 62 is supported on the web 66 by a shoulder screw 68, and ball bearings 70 rotatably mount the roller on the screw 68. A radial flange 72 on the outer end of the roller has a sufficiently large radius to assure that the flange will engage the panel edge 14 to serve as a finger as shown in FIG. 4. The roller axis is essentially parallel to the panel surface and perpendicular to the panel edge so that the probe 60 rolls easily along the edge of the panel.

As shown in FIGS. 4, 5 and 7, the probe 40 is replaced by probe 74 which has a plate 76 carrying a web 78 which supports two outer rollers 80 having flanges 82, and an inner roller 84 that has no flange. The rollers 80 are the same as the roller 62 and are mounted in the same manner. These rollers 80 engage the panel edge as indicated in FIG. 4 so that the flanges 82 serve as fingers and the roller 84 assists in defining the reference plane. The axes of rollers 80, 84 are parallel to the axis of roller 62.

The probe 60 is assembled to the slide 30 of FIG. 2 and the probe 74 is assembled to the slide 42. The outer surface of each roller acts as a contact pad and each flange is a finger. The instrument is used in the same manner as the first embodiment described above.

It will thus be seen that the gap and flushness measuring tool according to the invention is a simple tool for accurately making two simultaneous measurements in the form of electrical output signals and is especially suited for making many successive measurements along a pair of panels in a short period of time.

The embodiments of the invention for which an exclusive property or privilege is claimed are defined as follows:

1. A device for simultaneously measuring the gap between edges of adjacent panels and the flushness of panel surfaces comprising;
   a device body,
   first and second probes mounted on the body, each probe having a finger for extending into the gap to contact a panel edge and a pad for contacting a panel surface,
   the first probe being mounted for movement relative to a first reference position in a direction to ensure engagement of both probe fingers with panel edges,
   the second probe being mounted for movement from a second reference position in a direction to ensure engagement of both probe pads with the panel surfaces, and
   means for measuring the displacement of each probe from its respective reference position to obtain a measure of the gap between the panels and the flushness of the panel surfaces.

2. A device for simultaneously measuring the gap between edges of adjacent panels and the flushness of panel surfaces comprising;
   a device body,
   first and second probes slideably mounted on the body, each probe having a finger for extending into the gap to contact a panel edge and a pad for contacting a panel surface,
   the first probe being mounted for movement from a first reference position in a direction to ensure engagement of both probe fingers with panel edges so that the finger separation depends on the size of the gap,
   the second probe being mounted for movement relative to a second reference position in a direction generally perpendicular to the direction of the first probe to ensure engagement of both probe pads with the panel surfaces so that the displacement of the second probe from its reference position depends on the flushness of the panel surfaces, and
   a pair of electrical transducers for measuring the position of each probe relative to its respective reference position to obtain signals representing the gap between the panels and the flushness of the panel surfaces.

3. A device as defined in claim 2 wherein each pad is a roller mounted to roll along the surface of the panel in a direction parallel to the panel edges to facilitate movement of the device along the gap whereby multiple measurements can be made during such movement.

4. A device as defined in claim 3 wherein each probe finger is a flange on one of said rollers positioned to extend into the gap and engage an edge of a panel for movement therealong.

5. A device for simultaneously measuring the gap between edges of adjacent panels and the flushness of panel surfaces comprising;
   a device body,
   first and second probes mounted on the body, each probe having a finger for extending into the gap to contact a panel edge and a pad for contacting a panel surface,
   the first probe being slideably mounted and spring loaded for movement in a direction to ensure engagement of both probe fingers with panel edges,
   the second probe being slideably mounted and spring loaded for movement against a panel surface, and
   means for measuring the distances between the probe fingers and the probe pads to obtain a measure of the gap between the panels and the flushness of the panel surfaces.

6. A device for simultaneously measuring the gap between edges of adjacent panels and the flushness of panel surfaces comprising;
   a device body,
   first and second probes mounted on the body, each probe having a finger for extending into the gap to contact a panel edge and a pad for contacting a panel surface, the first probe being slideably mounted and spring loaded for movement in a direction to ensure engagement of both probe fingers with panel edges, the second probe being slideably mounted and spring loaded for movement against a panel surface, electrical transducers for measuring the distances between the probe fingers and the probe pads to obtain signals representing the gap between the panels and the flushness of the panel surfaces, and means responsive to the signals for displaying the gap and flushness measurements.

7. A device for simultaneously measuring the gap between edges of adjacent panels and the flushness of panel surfaces comprising;

an L-shaped body having two legs, first and second probes slideably mounted on the respective legs for movement along the direction of the legs, each probe having a finger for extending into the gap to contact a panel edge and at least one pad for contacting a panel surface, the first probe being moveable relative to a first reference position to ensure engagement of both probe fingers with panel edges, the second probe being moveable relative to a second reference position to ensure engagement of both probe pads with the panel surfaces, and a pair of electrical transducers each extending along a leg and responsive to a respective probe for measuring the displacement of each probe from its respective reference position to obtain a measure of the gap between the panels and the flushness of the panel surfaces.

8. A device as defined in claim 7 wherein each pad is a roller mounted to roll along a panel surface in a direction parallel to the panel edges to facilitate movement of the device along the gap whereby multiple measurements can be made during such movement.

9. A device as defined in claim 8 wherein each probe finger is a flange on one of said rollers positioned to extend into the gap and engage an edge of a panel for movement therealong.

* * * * *